April 25, 1967          J. J. NASH          3,315,565

AIR-BORNE ROCKET LAUNCHERS

Filed Jan. 15, 1965          9 Sheets-Sheet 1

INVENTOR.
JOHN J. NASH
BY
ATTORNEY

April 25, 1967    J. J. NASH    3,315,565
AIR-BORNE ROCKET LAUNCHERS
Filed Jan. 15, 1965    9 Sheets-Sheet 2

INVENTOR.
JOHN J. NASH
BY
Alfred W Petchaft
ATTORNEY

April 25, 1967 J. J. NASH 3,315,565
AIR-BORNE ROCKET LAUNCHERS
Filed Jan. 15, 1965 9 Sheets-Sheet 3

INVENTOR.
JOHN J. NASH
BY Alfred W Petchaft
ATTORNEY

April 25, 1967     J. J. NASH     3,315,565
AIR-BORNE ROCKET LAUNCHERS
Filed Jan. 15, 1965     9 Sheets-Sheet 4

INVENTOR.
JOHN J. NASH
BY
ATTORNEY

April 25, 1967 J. J. NASH 3,315,565
AIR-BORNE ROCKET LAUNCHERS
Filed Jan. 15, 1965 9 Sheets-Sheet 7

INVENTOR.
JOHN J. NASH
BY *Alfred W Petchaft*
ATTORNEY

April 25, 1967  J. J. NASH  3,315,565
AIR-BORNE ROCKET LAUNCHERS
Filed Jan. 15, 1965  9 Sheets-Sheet 8

INVENTOR
JOHN J. NASH
BY Alfred W. Petchaft
ATTORNEY

FIG. 25

INVENTOR.
JOHN J. NASH
ATTORNEY

United States Patent Office 3,315,565
Patented Apr. 25, 1967

3,315,565
AIR-BORNE ROCKET LAUNCHERS
John J. Nash, Ferguson, Mo., assignor to Chromcraft Corporation, St. Louis, Mo., a corporation of Missouri
Filed Jan. 15, 1965, Ser. No. 425,773
3 Claims. (Cl. 89—1.807)

This invention relates in general to certain new and useful improvements in aerial weaponry and, more particularly, to an air-borne rocket launcher.

At the present time, many types of military aircraft are equipped with rocket launchers that carry a plurality of individual rockets and are ordinarily suspended beneath the wing or fuselage of the airplane, depending upon its construction and configuration. These rocket launchers can only be used once and are usually jettisoned after the salvo of rockets has been fired. Moreover, such rocket launchers are either capable of firing all rockets at once or firing the rockets in a closely spaced successive order, the latter type of firing being known as "ripple fire."

Conventional types of rocket launchers have several disadvantages. In the first place, no matter how inexpensively a rocket launcher may be constructed, it must have sufficient strength to withstand the various stresses resulting from the aerodynamic forces imposed upon the rocket launcher while the airplane is in flight and from the pyrotechnical conditions to which the launcher is subjected at the time of firing. Consequently, rocket launchers are relatively expensive and if a rocket launcher can be only used once, the cost of a salvo of rockets becomes rather great. In addition logistic problems become acute because rocket launchers are bulky to ship or store and therefore a great deal of shipping and storage space must be used to maintain an adequate supply of single-use launchers in the theater of combat.

An even more serious military problem results from the fact that presently available rocket launchers can only fire a salvo of rockets, either by simultaneous fire or by so-called "ripple fire." In either case, an airplane so armed becomes a highly inflexible weapon in terms of firepower. Most military aircraft can only be armed with either two or four rocket launchers and, in such case, the airplane will only have two or four shots at an enemy target. Once these shots have been utilized, the airplane becomes virtually weaponless and must retire to its base for re-arming. This means, of course, that a pilot can only fire a salvo of rockets at a major target or in a defensive emergency.

It is, therefore, the primary object of the present invention to provide a rocket launcher which can be re-loaded and reused a number of times before it must be discarded.

It is another object of the present invention to provide a rocket launcher of the type stated and the necessary switching means associated therewith so that the rockets within a single rocket launcher can be fired either in a "ripple salvo" or singly at the discretion of the pilot.

It is a further object of the present invention to provide a rocket launcher of the type stated which is simple, rugged, and yet highly economical in construction so as to withstand aerodynamic stresses as well as pyrotechnical conditions and thus be capable of repeated reloading and reuse.

It is an additional object of the present invention to provide a rocket launcher of the type stated which is relatively simple to load and arm.

With the above and other objects in view, my invention resides in the novel features of form, construction, arrangement, and combination of parts presently described and pointed out in the claims.

In the accompanying drawings—

Figure 1:
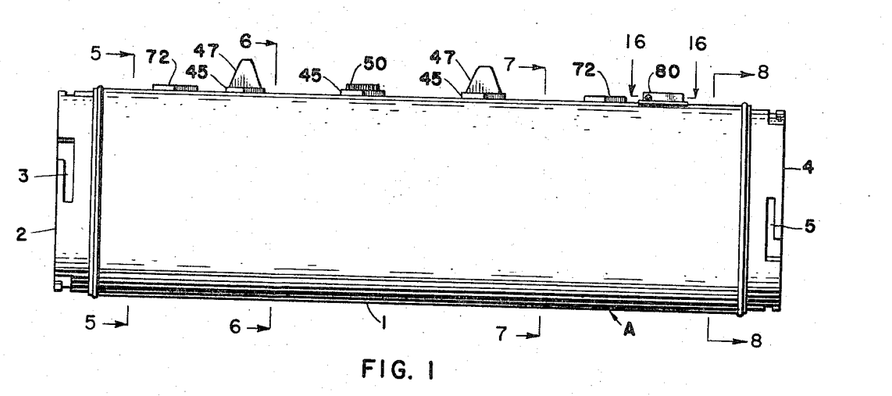
FIG. 1 is a side elevational view of a rocket launcher constructed in accordance with and embodying the present invention.
Figure 2:
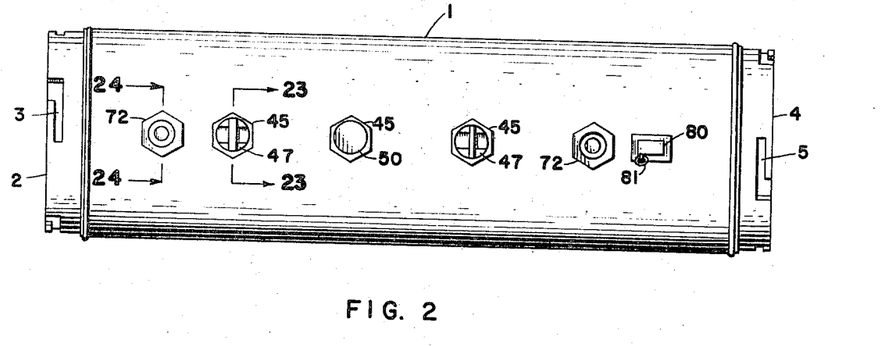
FIG. 2 is a top plan view of the rocket launcher.
Figure 3:
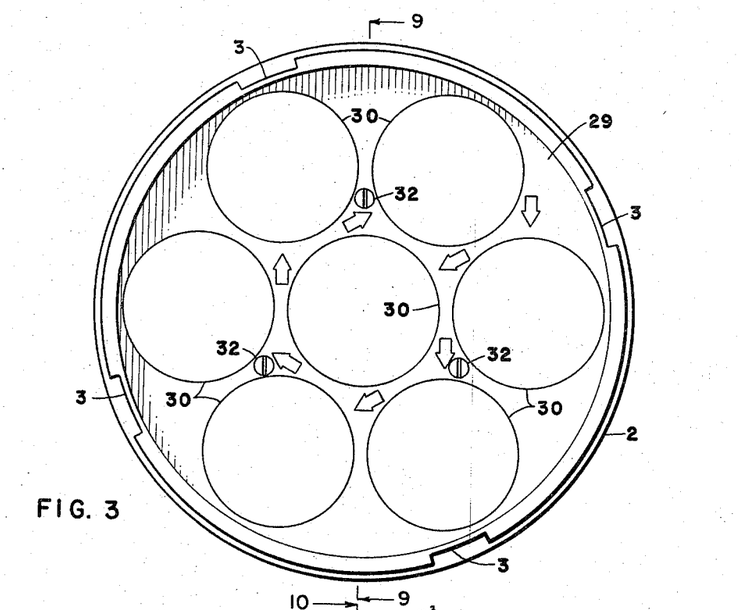
FIG. 3 is a front elevational view of the rocket launcher.
Figure 4:
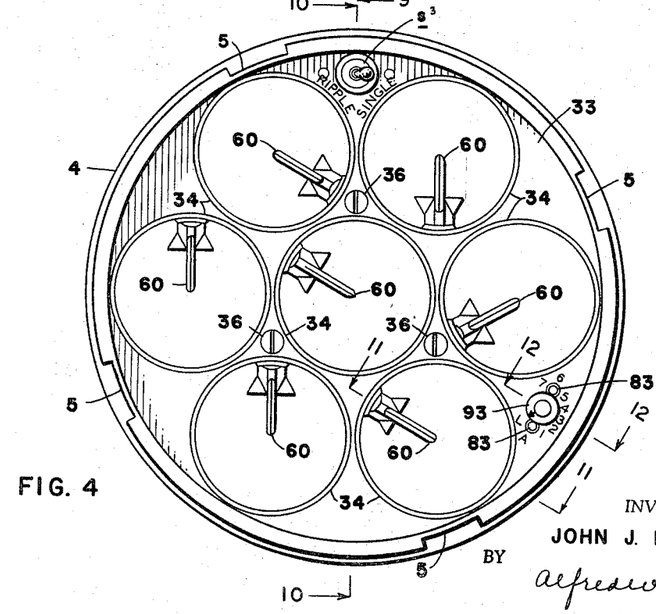
FIG. 4 is a rear elevational view of the rocket launcher.
Figure 5:
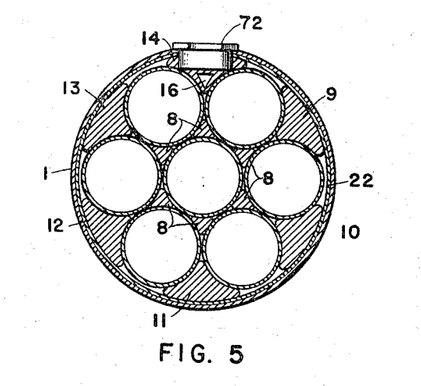
FIGS. 5, 6, 7, and 8 are transverse sectional views taken along lines 5—5, 6—6, 7—7, and 8—8, respectively, of FIG. 1.
Figure 6:
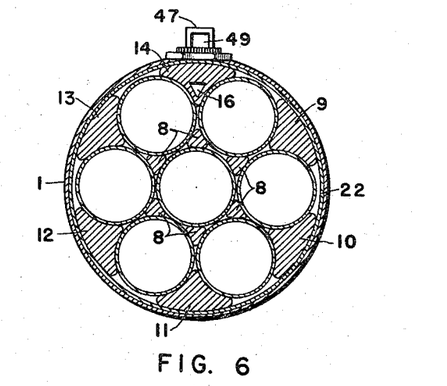
Figure 7:
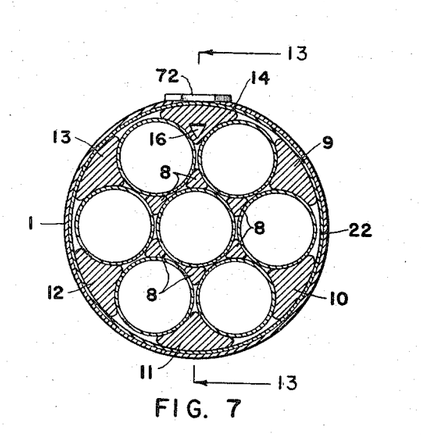
Figure 8:
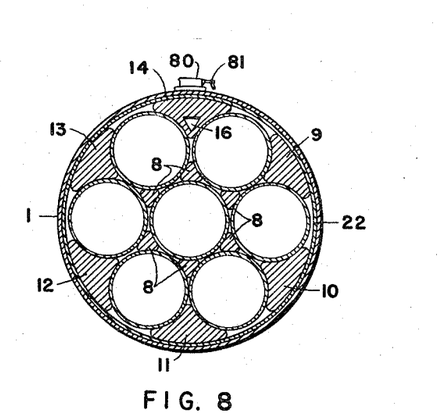

Referring now in more detail and by reference characters to the drawings, which illustrate a preferred embodiment of the present invention, A designates a rocket launcher comprising an elongated cylindrical outer aluminum tube or main shell 1 preferably made of a structurally strong aluminum alloy having sufficient wall thickness so as to possess substantial structural strength. As is true of all devices intended for aeronautical use, a proper engineering choice must be made as to the alloy, wall thickness, and other dimensions so as to achieve the requisite strength without excessive weight, but these are matters which are well within the competence of persons skilled in the art and need not be discussed in detail herein. At its forward end, that is to say the left-hand end, as shown in FIG. 1, the main shell 1 is provided, as will be presently more fully described, with an annular end-rim 2 having a plurality of uniformly spaced bayonet-slots 3. At its rearward end, the main shell 1 is similarly provided with an annular end-rim 4 having a plurality of uniformly spaced bayonet-slots 5. The end-rims 2, 4 are intended for the reception of conventional sheet metal end-caps which can be placed thereon after the rocket launcher A has been loaded and is being stored preparatory to installation upon an aircraft. Subsequently, after the rocket launcher A has been installed on an aircraft ready for flight, these metal end-caps will be removed and a so-called "break-away" nose cone made of specially prepared frangible material will be attached to the forward end-rim 2 and the bayonet slots 3 are used for the retention thereof. Similarly a tail cone is attached to the end-rim 4 using the bayonet slots 5 for retention thereof. The metal end-caps do not form a part of the present invention and, therefore, are not disclosed or described herein. The nose cone and tail cone forms the subject matter of separate inventions which are disclosed and described in other patent applications.

Figure 9:
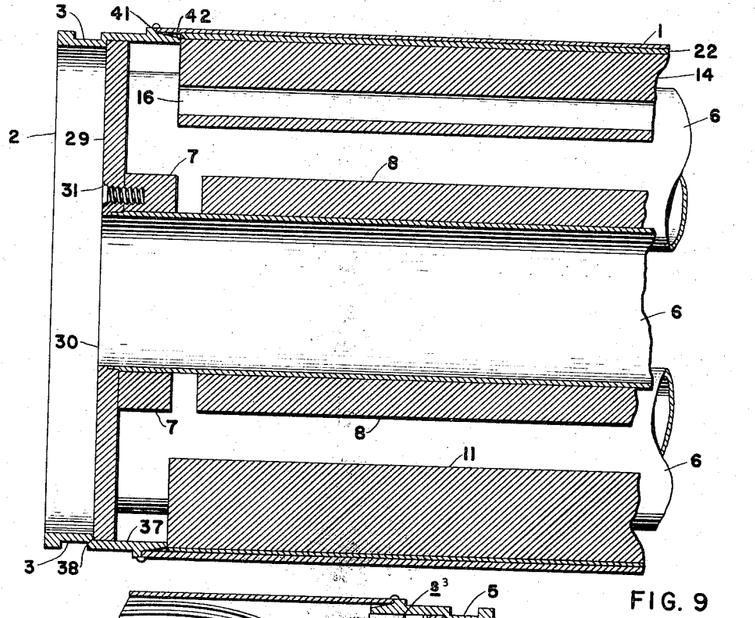
FIG. 9 is a fragmentary sectional view taken along line 9—9 of FIG. 3.
Figure 10:
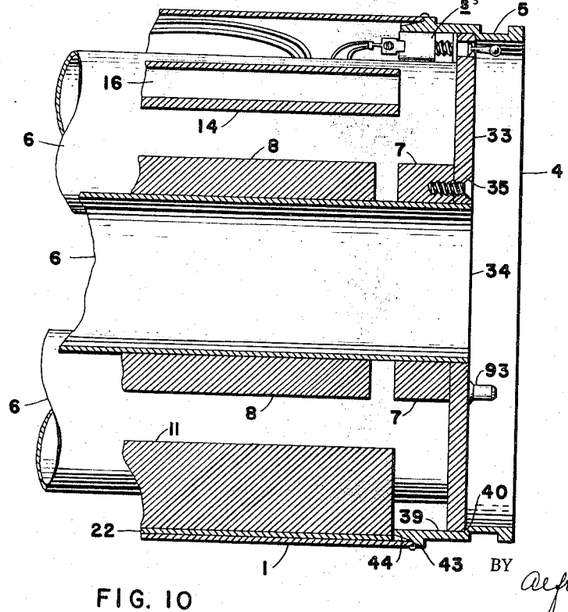
FIGS. 10, 11, and 12 are fragmentary sectional views taken along lines 10—10, 11—11, and 12—12, respectively, of FIG. 4.
Figure 14:
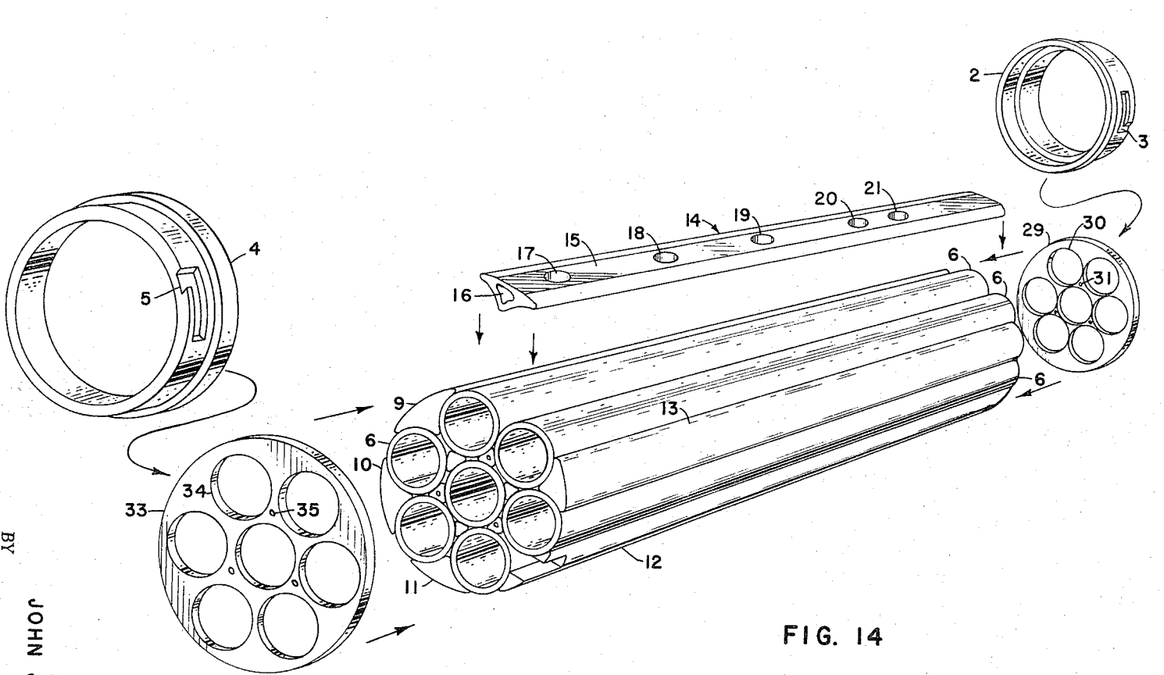
FIG. 14 is an exploded perspective view of the interior components forming a part of the rocket launcher.
Figure 15:
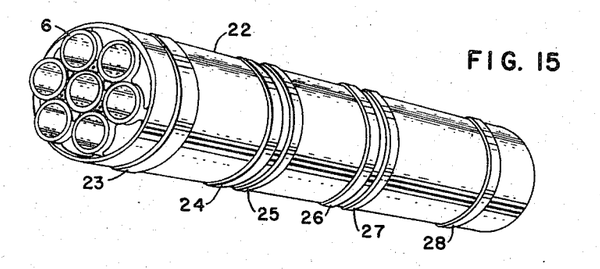
FIG. 15 is a perspective view of the interior components of the rocket launcher in assembled relation.
Figure 16:
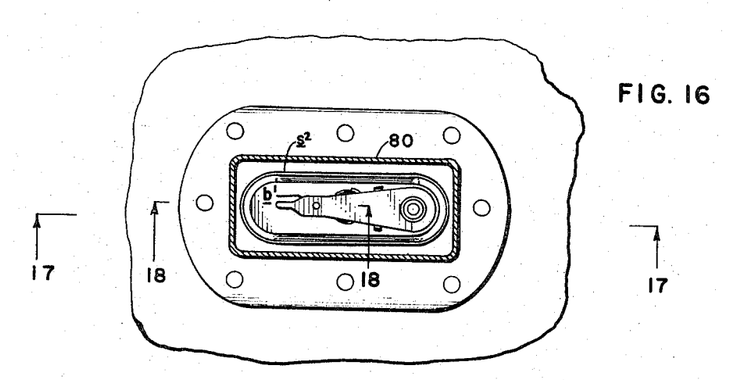
FIG. 16 is a fragmentary sectional view taken along line 16—16 of FIG. 1.
Figure 17:
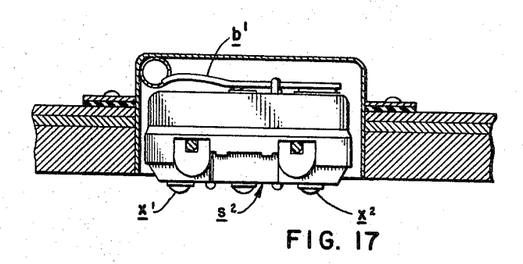
FIGS. 17 and 18 are fragmentary sectional views taken along lines 17—17 and 18—18, respectively, of FIG. 16.

The internal construction of the rocket launcher A, which contributes in substantial measure to the reusability and durability thereof, is best seen in FIGS. 14 and 15 and consists of a unitary sub-assembly made up of a number of identical thin-walled aluminum rocket tubes 6. In the embodiment shown, there are seven of these rocket tubes 6 arranged in a cluster with one of the rocket tubes 6 in a central or axial position and the other six of the rocket tubes 6 disposed in uniformly spaced annular relation therearound. The six rocket tubes 6 in the outer ring of the cluster are each provided adjacent their rear ends with radially outwardly presented lugs 7 as shown in FIGS. 9 and 10 and for purposes presently more fully appearing.

The outer rings of rocket tubes 6 are spaced from each other and from the central rocket tube 6 by six elongated wooden spacer-rods 8 of somewhat triangular cross-sectional shape. In addition, the outer rings of rocket tubes 6 are spaced from each other externally around the peripheral region of the cluster by means of elongated wooden spacer-bars 9, 10, 11, 12 and 13, each of which is formed with three longitudinally extending arcuate faces, two of which conform to the arcuate contour of the rocket tubes 6 and extend inwardly into snug-fitting relationship within the somewhat V-shaped spaces between adjacent pairs of rocket tubes. The outwardly presented face of each of the spacer-bars 9, 10, 11, 12 and 13 conforms to the circular contour of the interior face of the main shell 1. In this connection, it should be noted that the spacer-bar 12 is also slotted at its rear end, all as best seen in FIG. 14 and for purposes presently more fully appearing.

Also forming a part of the internal sub-assembly is a hanger-beam 14 which is similar in cross-sectional shape to the other spacer-bars 9 but is provided with a flattened or planar top face 15 and is formed preferably as an aluminum extrusion so as to have a hollow channel 16 extending entirely therethrough from end to end. Along its length, at suitably spaced intervals, the hanger-beam 14 is provided with internally threaded circular apertures 17, 18, 19, 20, and 21, also as best seen in FIG. 14 and for purposes presently more fully appearing.

The spacer-rods 8 and the spacer-bars 9, 10, 11, 12, and 13 are somewhat shorter than the length of the rocket tubes 6 and are arranged in lengthwise symmetrical relation so that the rocket tubes 6 project forwardly and rearwardly beyond the ends thereof. The hanger-beam 14 is even shorter so as to provide adequate clearance at the rear end of the assembly for purposes presently more fully appearing. The cluster of rocket tubes as positioned by the spacer-rods 8 and the spacer-bars 9, 10, 11, 12, and 13 and hanger-beam 14, is completely wrapped with a relatively thick interliner 22 formed preferably of heavy cardboard and bound together by a plurality of encircling steel straps 23, 24, 25, 26, 27, 28, located at axially spaced intervals so as to avoid interference with the apertures 17, 18, 19, 20, and 21, all as best seen in FIG. 15.

Provided for attachment to the forward end of the cluster of rocket tubes 6 is a circular front plate 29 having seven circular apertures 30 of substantially the same diametral size as the internal diametral size of the rocket tubes 6 and located for coaxial registration respectively therewith. Internally the apertures 30 are counter bored to provide annularly shouldered recesses into which the forward ends of the rocket tubes are snugly fitted. In this connection, it should be noted that the apertures 30 of the front plate 29 are substantially coincident with the internal surfaces of the rocket tubes 6 so that the front plate 29 in effect shrouds the forward annular end faces of the rocket tubes 6 and protects them against the back-flash of the rockets as they are fired and leave the forward end of the rocket launcher A. The front plate 29 is provided with three small apertures 31 for the reception of drive screws 32 which extend axially into the ends of three of the spacer-rods 8. Similarly provided for attachment to the rearward end of the cluster of rocket tubes 6 is a rear plate 33 having seven circular apertures 34 which are substantially of the same diametral size as the external diametral size of the rocket tubes 6 and are adapted to fit snugly and retentively around the rear ends thereof. The rear plate 33 is also provided with three small apertures 35 for the reception of drive screws 36 which extend into three of the spacer-rods 8 and hold the plate 33 in place.

The front plate 29 is seated snugly within an internal annular groove 37 formed in the end-rim 2 and abuts endwise against a rearwardly presented annular shoulder 38 thereof. Similarly, the rear plate 33 is snugly fitted into an annular groove 39 formed in the end-rim 4 and fitted up into endwise abutment against an annular shoulder 40 formed therein. Around its rearward portion, the end-rim 2 is externally provided with a rearwardly presented abutment shoulder 41 and an axially projecting tapered annular flange 42 for snugfitting disposition within the forward end of the main shell 1. Similarly, around its forward portion, the end-rim 4 is provided with a forwardly presented abutment shoulder 43 and a tapered annular flange 44 for snug-fitting disposition within the rear end of the main shell 1. The main shell 1 is of such axial length that it will extend more or less axially between the abutment shoulders 41 and 43, and, when assembled, is preferably welded at its opposite ends to these abutment shoulders 41 and 43, respectively. It should also be noted in this connection that the lug 7 abuts against the forwardly presented inner face of the rear plate 33, thereby preventing any tendency of the rocket tubes 6 to "creep" rearwardly as a result of thrust forces which are generated when the rockets are fired.

Rigidly secured in spaced axial alignment along the top of the main shell 1 and threadedly secured within each of the apertures 18, 19, 20, of the spacer-bar 14 are identical suspension fittings 45, which are all provided with internally threaded sockets 46. Provided for interchangeable disposition within the socket 46 are suspension lugs 47 each integrally including an externally threaded base 48 and upwardly projecting suspension eye 49 adapted for hooked engagement in conventional suspension gear (not shown) which form a part of the airplane. As shown there are two such lugs 47 which are fitted to the fore and aft fittings 45. The intermediate fitting 45 is provided with an expendable molded plastic plug 50 merely for convenience. Most military aircraft require two such lugs in the positions shown but some military aircraft use only one such lug 47 located in the intermediate position, in which case the plastic plug 50 can be removed and one of the suspension lugs 47 substituted, the other being discarded. The suspension and related equipment of the airplane by which a rocket launcher or similar pad is hoisted into place and secured are conventional and, therefore not illustrated or described herein.

The rocket tubes 6 are all identical and each is of uniform internal diametral size such that it will smoothly and sungly, but nevertheless slidably, accommodate a particular rocket for which it is designed. It is, of course, obvious in this connection that every rocket launcher is dimensionally designed to fit some particular rocket and these dimensions can vary in the same way as the dimensions of different rockets will vary. It should also be noted that, although seven such rocket tubes 6 are shown herein, a different number may be used if desired. Each of the rocket tubes 6 is fully open at its forward and rearward ends and, adjacent to its rearward end, is provided with a tail-contact 51 which is formed preferably of bronze or other relatively strong metal having good electrical conductivity. The tail-contact 51 includes an elongated somewhat rectangular mounting plate 52 which is secured on the external face of the tube 6 by means of three sets of metallic screws 53, lock washers 54 and nuts 55, and elongated flat dielectric shims 56, 57, the latter being respectively located upon the external and interior faces of the tube 6, so that the tail-contact 51 is fully insulated from the tube 6. At its rearward end, the mounting plate 52 is integrally provided with a radially inwardly extending neck 58 which projects through an aperture 59 formed in the tube 6, the aperture 59 being perimetrally larger than the neck 58 so as to avoid accidental electrical contact therewith. On its interior end, the neck 58 is integrally provided with a rearwardly extending hook 60 which curves radially inwardly and is reversely bent in the forward direction, terminating in a contact point $p$ which is substantially coincident with the longitudinal centerline of the tube 6 and lies inwardly from the plane of the rear open end thereof. The leading edges of the neck 58 and hook 60 are knife-edged to deflect the rocket blast and debris. The neck 58 and hook 60 are also somewhat resilient and have a limited fore and aft deflectional capability for reasons presently more fully appearing.

Figure 11:
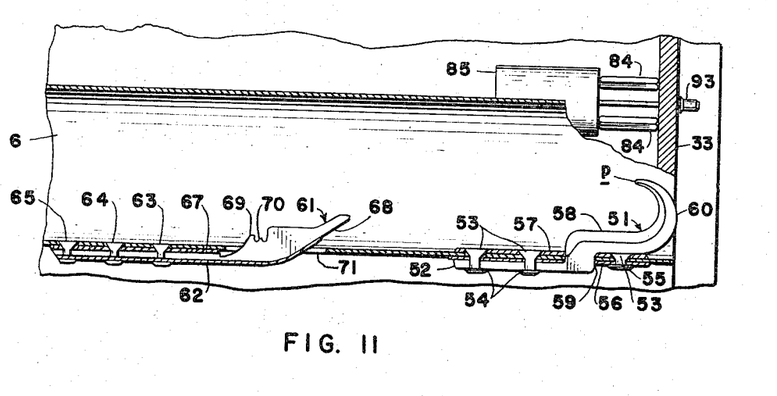
Figure 12:
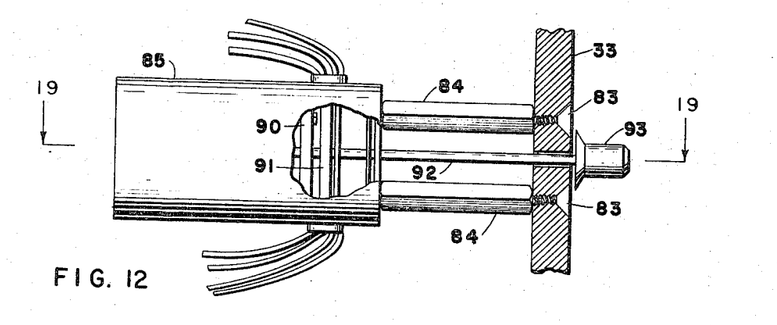
Figure 13:
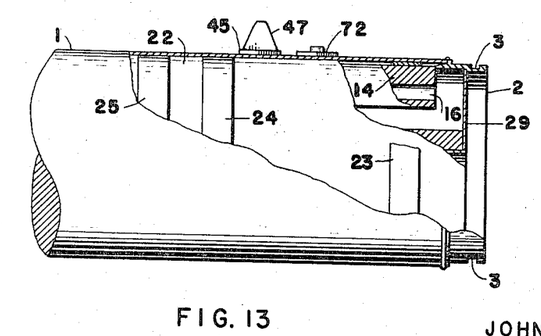
FIG. 13 is a fragmentary side elevational view, partly broken away and in section, of the rear portion of the rocket launcher.

Also rigidly mounted on the external face of the tube 6, a short distance forwardly from the tail-contact 51, is a spring-detent 61 formed of heat treated stainless steel or other similar resilient material having good electric conductivity and integrally including an elongated somewhat rectangular mounting plate 62 which is rigidly secured in place by means of rivets 63, 64, 65, and metallic shim 67. The rivets 63, 64, 65, and the shim 67, are so arranged that the spring-detent 61 is electrically grounded to the tube 6. At its rear end, the mounting plate 62 is integrally provided with an angularly inwardly deflected flange 68 and a radially inwardly projecting blade 69 having a suitably shaped detent notch 70 for retentive latched engagement with a conventional latching rim of a rocket for which the launcher A is intended. The flange 68 and blade 69 extend radially inwardly into the interior of the tube 6 through an axially elongated aperture 71 which is of larger perimetral size than the cross-sectional size of the combined flange 68 and blade 69 so that the latter elements are free to move without accidental mechanical interference against portions of the tube 6, all as best seen in FIG. 11. The axial distance between the detent notch 70 and contact point $p$ is slightly shorter than the corresponding distance in the rocket. Thus when the rocket is inserted in the tube 6 and pushed inwardly so that the rim-groove is engaged in the detent notch 70, the neck 58 and hook 60 will deflect to the rear slightly under such pressure and thereby good firm electrical contact with the contact point $p$ is insured.

Rigidly mounted in the main shell 1 in axial alignment with the suspension fittings 45, is an externally threaded tubular fitting 72 threaded into the aperture 19 of the spacer-bar 14 and rigidly locked in place by means of a relatively thin lock nut 73 which is drawn up tightly against the outer surface of the main shell 1. On its outer face, the fitting 72 is provided with an externally threaded upstanding cylindrical collar 74 for detachable engagement with a lock collar 75 operatively mounted on the end of a multiple pronged connector plug 76 which is, in turn, conventionally attached to the end of a two-conductor cable 77 extending upwardly through the fuselage of the airplane to a normally open fire switch $s^1$ having a push-button 78 and being mounted on the instrument panel thereof. The multiple pronged connector plug 76 is adapted for conventional electric circuit-making engagement in a complementary female connector plug 79 rigidly secured in any suitable or conventional manner within the fitting 72.

Figure 18:
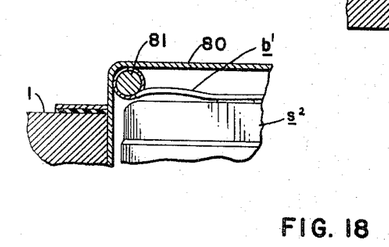
Figure 19:
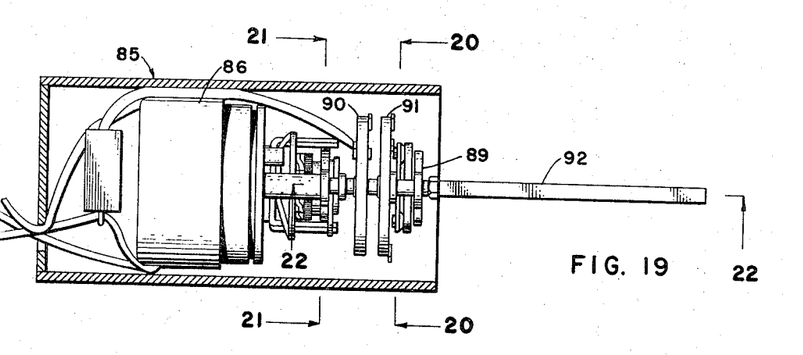
FIG. 19 is a longitudinal sectional view taken along line 19—19 of FIG. 12.
Figure 20:
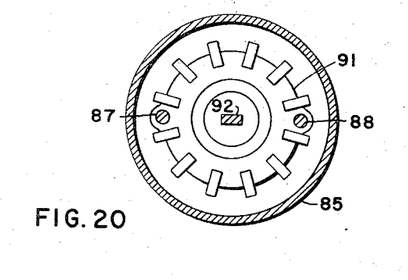
FIGS. 20 and 21 are transverse sectional views taken along lines 20—20 and 21—21, respectively, of FIG. 19.
Figure 21:
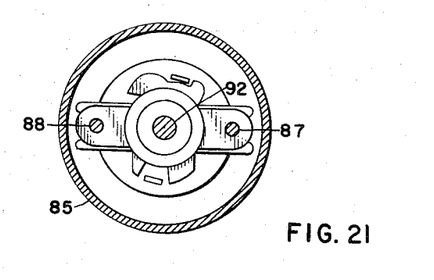
Figure 22:
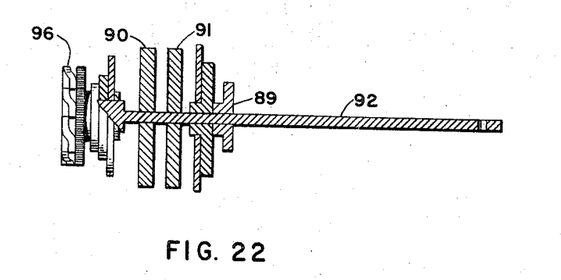
FIG. 22 is a fragmentary sectional view taken along line 22—22 of FIG. 19.

Rigidly secured and gasketed externally upon the top of the main shell 1, adjacent to the rear end thereof, is a small rectlinear box-like housing 80 provided with a single pole double throw switch $s^2$ containing one blade $b^1$ and two contacts $x^1$, $x^2$. The switch $s^2$ is resiliently biased toward circuit-closed position, but is adapted to be held in open or non-contactive position by means of a pull-pin 81, as best seen in FIG. 18. In this position the blade $b^1$ engages contact $x^2$ and the entire circuit is grounded as a safety measure when the rocket launcher A has been loaded. Thus, when the rocket launcher A is being hoisted up in place, none of the rockets can be accidentally fired, but as soon as the rocket launcher A has been finally secured to the airplane ready for take-off, the pin 81 can be pulled and the switch blade $b^1$ will spring into contactive position, so that the rockets will be electrically connected to the firing circuitry within the airplane.

The firing circuitry utilized in conjunction with the rocket launcher A, and forming part of the present invention, includes a single pole, double throw toggle switch $s^3$ preferably mounted upon the end plate 33, as shown in FIG. 10. Also mounted upon the end plate 33, by means of screws 83 and spacer-sleeves 84 is a solenoid-actuated rotary stepping switch 85, as shown in FIGS. 12 and 19–22.

Figure 25:
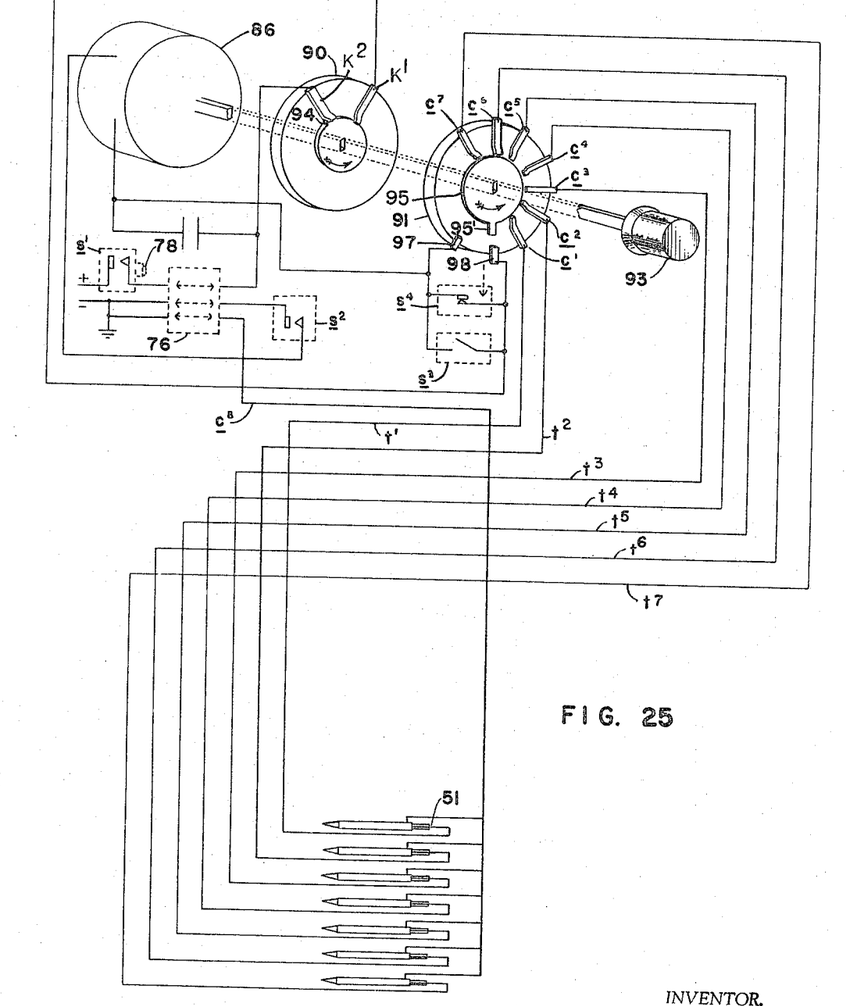
FIG. 25 is a schematic view showing the electromechanical components employed in the firing system of the present invention.

The rotary switch 85 includes a ratcheting rotary solenoid 86 which is mechanically connected by means of a pair of support rods 87, 88, to a circular end plate 89. Also supported in spaced parallel relation between the rotary solenoid 86 and the end plate 89 are two stationary circular contact-decks 90, 91, which are respectively provided with two and seven contacts wired, as schematically shown in FIG. 25, the former being designated $k^1$ and $k^2$ while the latter are designated $c^1$, $c^2$, $c^3$, $c^4$, $c^5$, $c^6$, $c^7$. Extending concentrically through the contact-decks 90, 91, is a rotor-shaft 92 which is operatively connected at one end to the rotary mechanism of the solenoid 86 and at its other end projects freely through the plate 33, being provided on such projecting end with a control knob 93. Rigidly mounted on the rotor-shaft 92, for rotation therewith, are two circular contactors 94, 95, which are in continuous electrical contact with one another and are located in such position as to make electrical contact with the contacts of the contact-decks 90, 91, respectively. Circular contactor 95 is provided with a radially projecting contactor tab 95′ which successively engages and establishes electrical contact with the contacts $c^1$, $c^2$, $c^3$, $c^4$, $c^5$, $c^6$, $c^7$. Operatively associated with the rotary solenoid 86 is a rocking cam 96 which oscillates with each incremental movement thereof and momentarily opens a normally closed interrupter switch $s^4$. Thus the supply circuit to the rotary solenoid 86 is broken momentarily allowing the mechanism to return to initial position for a further incremental movement when next energized.

Figure 23:
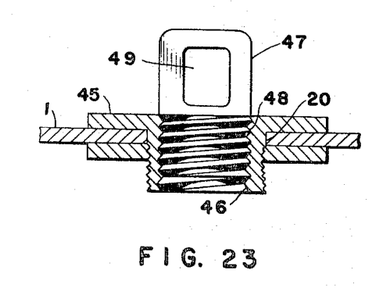
FIGS. 23 and 24 are fragmentary sectional views taken along lines 23—23 and 24—24 respectively of FIG. 2.
Figure 24:
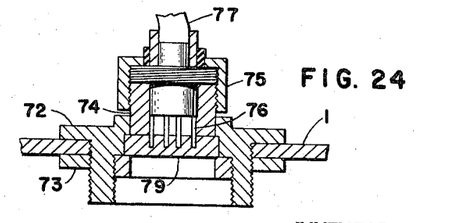

For the seven-tube rocket launcher A, herein described, seven contacts of the contact-deck 91 are connected by seven conductors $t^1$, $t^2$, $t^3$, $t^4$, $t^5$, $t^6$, $t^7$, to the seven tail contacts 51. Thus, when a rocket launcher A is being prepared for attachment to an airplane, the cable 77 which is a part of the aircraft can be pulled down, plugged in, and secured in place by screwing the lock collar 75 onto the cylindrical collar 74, thereby effecting mechanically detachable electrical connection from the rocket launcher A to the firing switch $s^1$ within the airplane. In this connection, it should be noted that the spring detents 61 are all grounded through the rocket tubes 6, the hanger-beam 14 and conductor $c^8$, through the connector plugs 76, 79, to the fuselage and framework of the airplane to complete the other side of the firing circuitry, as shown in FIG. 23.

The rotary contactor 95 is connected to the "hot" side of the circuit through contactor 94, so that, as the solenoid 86 rotates step-by-step, the shaft 92 will rotate incrementally and the contactor tab 95′ carried thereby will successively make contact with each of the said seven contacts on the contact-deck 91. Consequently, rocket firing impulses will be successively delivered at spaced intervals to each one of the seven rockets in the rocket launcher A. The toggle switch $s^3$ is connected across the interrupter switch $s^4$ as shown in FIG. 23 so that when in one position, namely its open position, which for convenience may be marked "ripple-fire," the solenoid 86 will automatically continue to step through one full cycle so that all the rockets will be fired in closely spaced successive order in a single "ripple" salvo whenever the button 78 of the switch $s^1$ is pushed inwardly. However, it should be noted that the contactor tab 95' will come to rest at the end of each cycle at a "dead" position opposite a contact 97 in which position all circuits are disconnected. This may be referred to as the "load" position and serves as a safety feature which additionally insures against accidental firing of one or more rockets when the launcher A has been loaded and the airplane is awaiting take-off. When the pin 81 is pulled, the rockets, even then, cannot be fired until the armorer rotates the shaft 92 one preliminary time, thereby moving the stepping switch 85 to the "arm" position opposite a contact 98, that is to say, a position located one increment prior to contact $c^1$, as shown in FIG. 25. Thereafter, when the button 78 of the switch $s^1$ is pushed in, the rockets will fire in an automatic "ripple" salvo as just described. On the other hand, if the toggle switch $s^3$ is shifted to its alternative position, namely its closed position, which may be identified as the "single fire" position, only one rocket fires each time the button 78 of the switch $s^1$ is pushed in. These results can be accomplished by the circuitry shown in FIG. 25, as will be evident to any person familiar with electrical circuitry of this type.

The rocket launcher A is manually loaded from the front end by inserting rockets, fin end first, into the forward ends of each of the tubes 6. The fins are oriented so as to clear or "straddle" the spring-detent 61 and tail-contact 51. The rockets will, of course, be pushed rearwardly until each is entirely housed within a tube 6 and its rim is latched in the spring-detent 61 against the tail-contact 51. When in this latched position, each rocket will be firmly held in the rocket launcher A and will not jar loose as a result of mechanical impacts and aerodynamic forces encountered either in take-off, flight or landing. However, when fired, the propulsive force of the propellant supply or rocket blast strikes the flange 68 of the spring-detent 61, and flexes it outwardly. Of course, when the detent 61 flexes outwardly, the notch 70 moves radially away from and free of the latching rim of the rocket, releasing the rocket for forward flight. It should be noted that detent 61 provides a positive lock for holding the rocket in the tube 6, whereas conventional launchers employ a frictional lock. Not only does this feature lessen the danger of a rocket becoming accidentally dislodged, but is also frees more of the propellant fore use in propelling the rocket toward its target inasmuch as it completely disengages the rocket when the rocket fires. None of the propellant is wasted, overcoming the frictional resistance exerted by a frictional lock of the type used on conventional launchers. Moreover, inasmuch as the leading edge of tail contact 51 is beveled in the formation of a knife edge, it will deflect the debris, thereby permitting continued use of the same tail contact for numerous rocket launchings. If the airplane returns to its base with any or all of its rockets unfired, the launcher A can be manually unloaded by disconnecting the cable 77, and then reaching into the tubes 6 from the rear with a screwdriver or similar long tool. By this means, the spring-detents 61 can be manually flexed outwardly to release the rockets so that the latter can be manually pushed forwardly out of the tubes 6. Whether fired or not, the launcher A can be reloaded whenever desired and thus can be used over and over again.

It should be understood that changes and modifications in the form, construction, arrangement, and combination of the several parts of the air-borne rocket launcher may be made and substituted for those herein shown and described without departing from the nature and principle of my invention.

Having thus described my invention, what I claim and desire to secure by Letters Patent is:

1. A rocket launcher comprising an outer metallic tubular shell rigidly provided at each end with a transverse bulkhead, a plurality of rocket tubes mounted at their opposite ends in and extending axially between said bulkheads within the shell in spaced parallel relationship, said tubes opening at each end externally through said bulkheads, a spring-detent projecting into each rocket tube and being adapted to shift radially outwardly under the propulsive forces exerted by the rocket when it is fired and a hook-like stop member rigidly mounted at the rear end of each rocket tube and comprising a mounting-plate portion fixedly secured to the wall of the tube and an integral, inwardly offset neck portion extending in longitudinal continuation thereof and proceeding longitudinally-rearwardly along the inner wall of the tube and terminating at its rearward end in a hook-like portion which curves rearwardly therefrom and thence forwardly into the tube interior, said hook-like portion having gradually diminishing section whereby it has limited resiliency and terminating in a point which is substantially coincident with the longitudinal centerline of the tube and is adapted to be contacted by the rear end of the rocket inserted therein, the inwardly facing surfaces of the neck portion and the forwardly facing surfaces of the hook-like portion being feathered down to a thin edge so as to cause minimum interference and turbulence within the rearwardly blasting jet stream from the rocket when fired.

2. In a rocket launcher having at least one rocket tube adapted to receive a rocket and means for releasably engaging the rocket within the tube, a tail contact comprising a mounting plate fixedly secured to the wall of the tube and an integral, inwardly offset neck portion extending in longitudinal continuation thereof and proceeding longitudinally-rearwardly along the inner wall of the tube and terminating at its rearward end in a hook-like portion which curves rearwardly therefrom and thence forwardly into the tube interior, said hook-like portion having gradually diminishing section whereby it has limited resiliency and terminating in a point which is substantially coincident with the longitudinal centerline of the tube and which is adapted to be contacted by a rocket properly positioned in said tube, the inner edges of the offset neck portion and the forward edges of the hook-like portion being beveled to knife-edge form whereby to provide inwardly and forwardly presented knife edges for deflecting the blast and debris ejected from the rocket upon ignition.

3. A rocket launcher tail contact according to claim 2 in which the mounting plate is secured to the external surface of the tube.

References Cited by the Examiner
UNITED STATES PATENTS

| | | | |
|---|---|---|---|
| 2,399,530 | 4/1946 | York et al. | 89—1.5 X |
| 2,421,893 | 6/1947 | Lambert et al. | 89—1.7 X |
| 2,609,730 | 9/1952 | Bergstrom | 89—1.7 |
| 2,832,265 | 4/1958 | Reid et al. | 89—1.7 |
| 2,844,073 | 7/1958 | Re et al. | 89—1.7 |
| 2,848,925 | 8/1958 | Hood | 89—1.806 |
| 2,931,273 | 4/1960 | Weatherhead | 89—1.7 |
| 2,958,261 | 11/1960 | Henig | 89—1.7 |

BENJAMIN A. BORCHELT, *Primary Examiner.*

SAMUEL W. ENGLE, *Examiner.*